Dec. 23, 1941.    J. H. KINDELBERGER    2,267,336
METHOD AND APPARATUS FOR FABRICATION OF SHEET METAL COVERING PARTS
Filed Jan. 30, 1939    4 Sheets-Sheet 1

Inventor
James Howard Kindelberger
By Lyon & Lyon
Attorneys

Dec. 23, 1941.  J. H. KINDELBERGER  2,267,336
METHOD AND APPARATUS FOR FABRICATION OF SHEET METAL COVERING PARTS
Filed Jan. 30, 1939  4 Sheets-Sheet 2
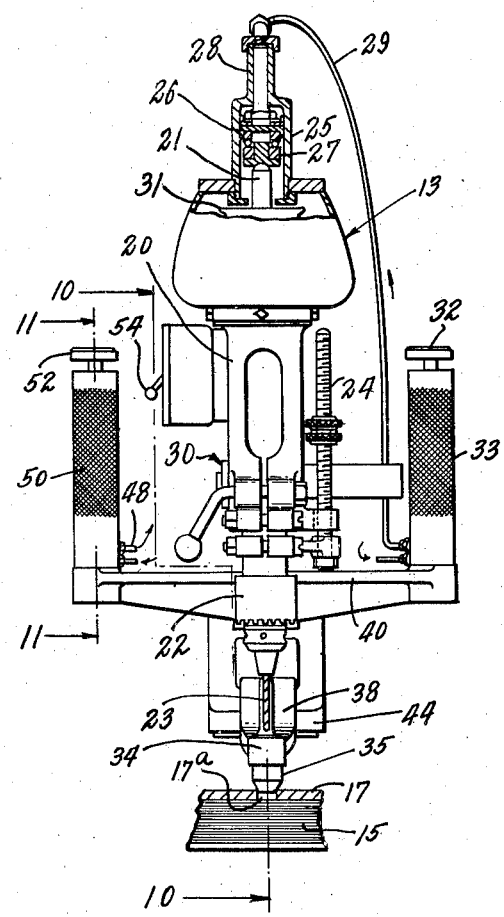
Inventor
James Howard Kindelberger
By Lyon & Lyon
Attorneys Dec. 23, 1941. J. H. KINDELBERGER 2,267,336
METHOD AND APPARATUS FOR FABRICATION OF SHEET METAL COVERING PARTS
Filed Jan. 30, 1939 4 Sheets-Sheet 3

Inventor
James Howard Kindelberger
By Lyon & Lyon
Attorneys

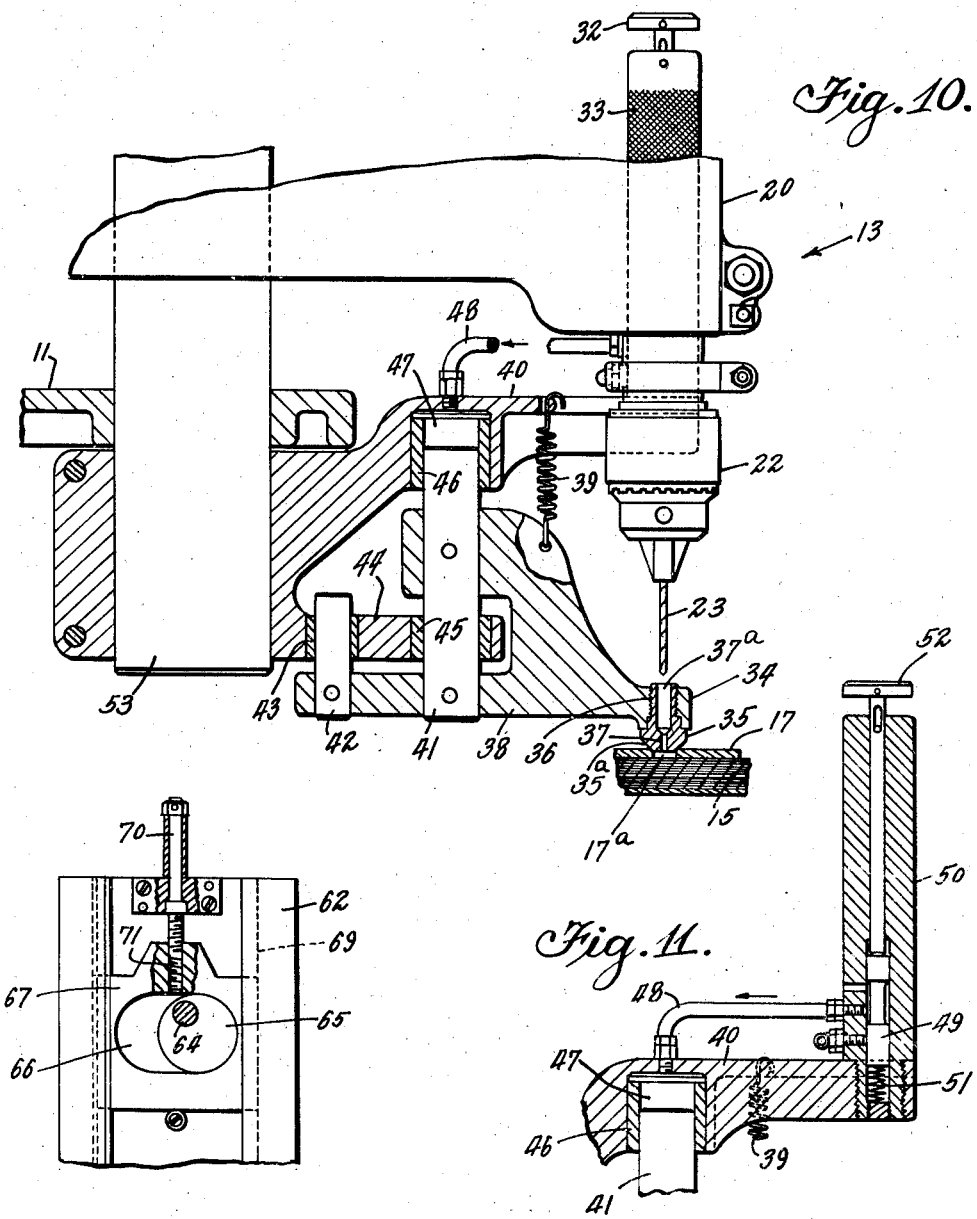

Patented Dec. 23, 1941

2,267,336

UNITED STATES PATENT OFFICE

2,267,336

METHOD AND APPARATUS FOR FABRICATION OF SHEET METAL COVERING PARTS

James Howard Kindelberger, Los Angeles, Calif., assignor to North American Aviation Inc., Inglewood, Calif., a corporation of Delaware Application January 30, 1939, Serial No. 253,616

7 Claims. (Cl. 77—6)

This invention relates to a method and apparatus for fabrication of sheet metal parts or portions and is more particularly related, although not so limited in its use, to the fabrication of relatively thin metal portions as used in the building up of wings, fuselages, tail surfaces, bulk heads, ribs, and other structural elements of aircraft.

In building of aircraft, preformed sections or elements of sheet metal are utilized, and there has long existed in this art a problem as to how to efficiently and economically, and upon a production basis, preform the said parts or portions.

In the formation of an aircraft, many hundreds of these small preformed sections or portions are utilized. They must be cut out to accurate size and shape, must be drilled for connecting rivets, must be formed with the required apertures therein, and must then be formed to the required profile. As each of the portions utilized must be riveted together after cutting, forming and drilling the rivet holes and the edges must be free of fins or burrs, must be sharply and truly cut so as to avoid formation of points of shear or failure under load, and the rivet holes as drilled must be free of burrs or fins to permit the riveted pieces or portions to lie flat together to insure the maximum of efficiency of the riveted connections.

I have found that many of these operations may be performed in multiple, and my invention has for its particular object the provision of a method of fabrication whereby a plurality of like parts or portions may be formed in a series of multiple operations from sheets of the alloyed metal in stacked relation both to drill and profile the said portions as required while still eliminating the formation of uneven sheared or burred edges of the profiled edges or drilled holes.

Another object of my invention is to provide apparatus for the fabrication of thin metal surface portions in multiple.

Another object of my invention is to provide a method or apparatus for the multiple drilling of stacked thin sheets of metal while avoiding the formation of uneven burred drilled holes in the individual sheets of metal.

Another object of this invention is to provide a method and apparatus for the multiple drilling of stacked thin sheets of metal wherein the stacked sheets are rigidly held down, wherein vibration of the drill with relation to the stacked sheets is eliminated, and wherein the holding means provides the means for guiding the drill rather than the drill locating means.

Another object of this invention is to provide a method and apparatus for the multiple drilling of stacked thin sheets of metal wherein the drilling means is supported so as to be movable over a wide radius from its support, and wherein the drill means is provided with a locking means applicable for locking the same with relation to the stacked sheets and is provided with a drill guide means independent of the stacked sheets or any drill locating template used therewith whereby relative vibration between the drill and stacked sheets of metal is avoided and wherein the drilling operations are performed without the formation of burrs or fins or the formation of uneven drilled holes.

Another object of my invention is to provide a method of and apparatus for the multiple profiling of sheet metal parts from stacked sheets of such metal.

Another object of my invention is to provide a method and apparatus for the fabrication of thin sheet metal parts from stacked sheets of such metal wherein the stacked sheets are patterned to the use of nesting templates and jigs and are drilled as directed through said templates and profiled as directed through said jigs while supported and without removal from said support, and wherein a minimum of waste material is had in the drilling and profiling of said parts or portions.

Other objects and advantages of this invention it is believed will be apparent from the following detailed description thereof as related to the single modication I have chosen for an illustration as shown in the accompanying drawings.

In the drawings:

Figure 3 is a front elevation on an enlarged scale of the drilling means embodied in my invention illustrating the same preparatory to the drilling of a hole in a fragment of a stack of sheets of relatively thin surface metal.

Figure 4 is a front elevation likewise on an enlarged scale of a profiling mechanism utilized in carrying out my invention to cut out a multiplicity of light parts from a fragment of a stack of sheets of relatively thin surface metal.

Figure 10 is a side elevation partly in vertical section illustrating particularly the drill locating and sheet metal holding means of my invention, the view being taken substantially on line 10—10 of Figure 3, with certain parts broken away.

Figure 11 is a further fragmentary sectional elevation taken substantially on the line 11—11 of Figure 3.

Figure 12 is an enlarged perspective partly in section of a locating and pressure foot of the drill means embodied in my invention.

Figure 13 is a fragmentary elevation partly in vertical section of a portion of the profiling means of my invention taken substantially on the line 13—13 of Figure 2.

Figure 14 is a sectional view taken substantially on the line 14—14 of Figure 4.

Figure 1:
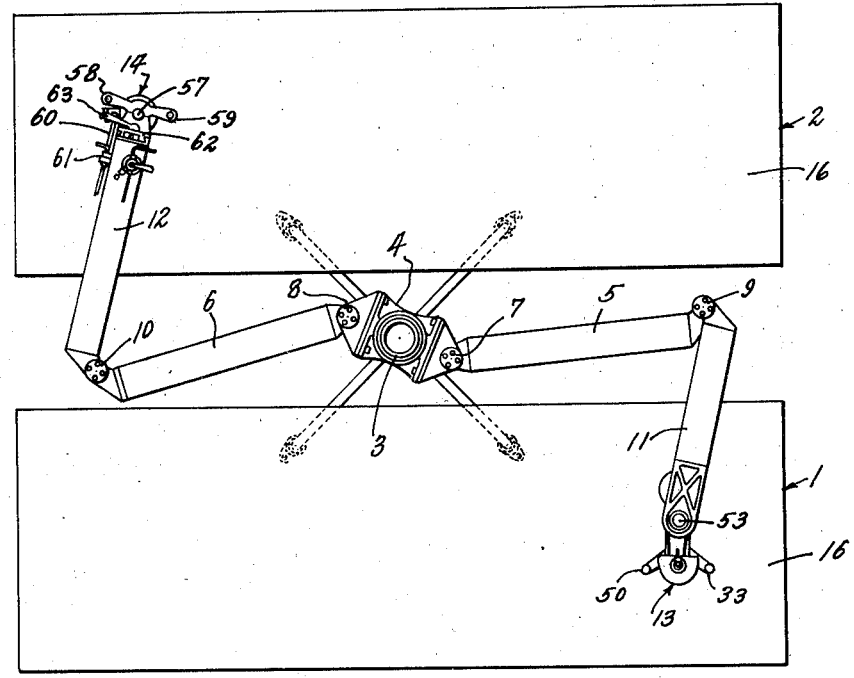
Figure 1 is a top plan view of the apparatus as may be utilized in carrying out my invention.
Figure 2:
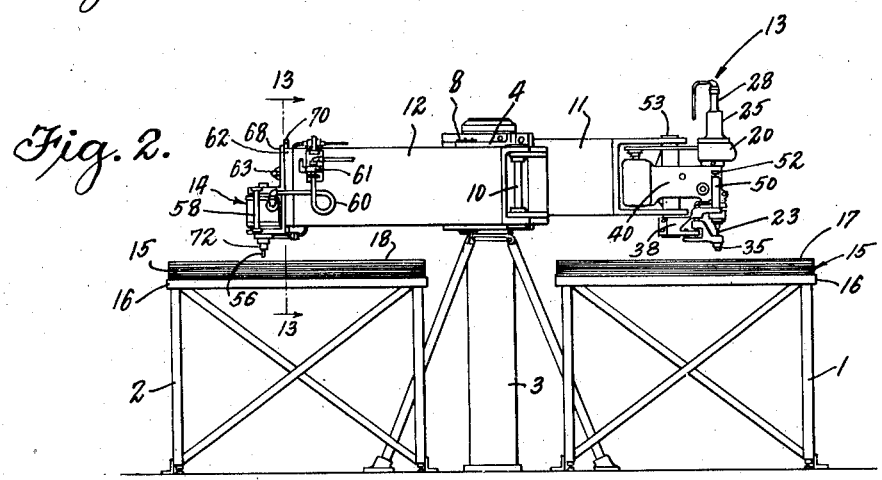
Figure 2 is an end elevation thereof.

My invention as illustrated in the accompanying drawings contemplates the employment of one or more pattern tables 1 and 2 in position with relation to a drill means and profiling means supporting post 3. The drill and profiling means are supported on the post 3 in such manner as to permit the location of the profiling means or drilling means over any portion or spot of the pattern tables 1 and 2. The supporting means includes a central swivel supporting bracket 4 which is suitably journaled on the post 3 and to which the radial drill arm 5, and radial profiling means arm 6, are pivotally supported, as by pivots 7 and 8, respectively. At the ends of the arms 5 and 6 are pivotally supported by means of vertical pivots 9 and 10 a drill support arm 11 and a profiling means support arm 12, the construction being such as to permit either the drill mechanism 13 or the profiling mechanism 14 to reach any location on pattern tables 1 and 2, or any portion or location of the stacked sheets of thin metal supported thereon.

The pattern tables 1 and 2 are of a size preferably directly related to the size of the sheets of metal from which the parts or portions are to be profiled and drilled. Thus, for example, when using the aluminum alloy commonly employed in the formation of aircraft parts, the tables are 48" x 148" so as to accommodate sheets of this same size. A stack of such sheets, as indicated at 15, are located upon the pattern tables 1 and 2 and are preferably positioned upon a cutting base 16. The cutting base 16 is preferably formed of some relatively inexpensive material such as a relatively thin and inexpensive wood veneer so that it may be cut or drilled without serious loss during the fabrication of the material and without damage to the pattern tables 1 and 2.

The number of sheets of sheet metal stacked upon the cutting base 16 depends considerably upon the gauge of the sheet metal and may consist of from one to ten or eighteen, or more, sheets so that during a single drilling operation, or the single operation of drilling and profiling the parts, one or more drilled parts are formed, or one or more parts are profiled in a single profiling operation.

Figure 5:
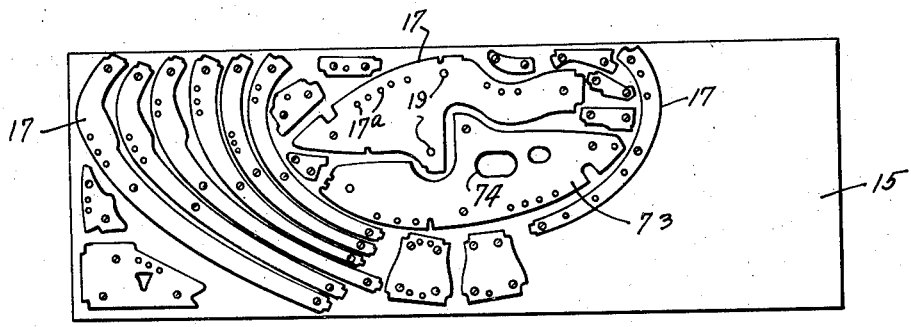
Figure 5 is a top plan view illustrating the pattern layout of drilling templates over a stack of sheets of relatively thin sheet metal.
Figure 6:
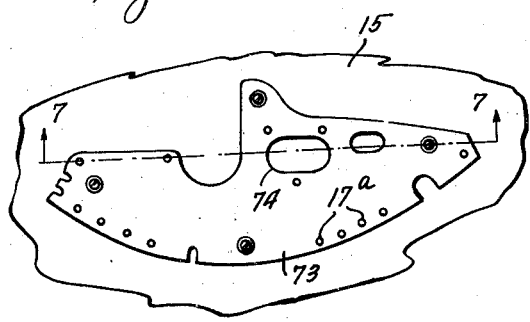
Figure 6 is a fragmentary plan similar to Figure 5 on an enlarged scale of a single drilling template with relation to a fragment of a stack of thin metal sheets.
Figure 7:
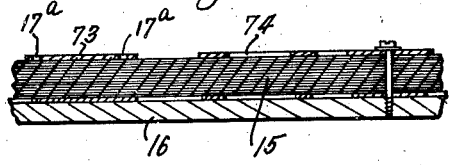
Figure 7 is a section edge view of the structure illustrated in Figure 6 taken substantially on the line 7—7 of Figure 6.
Figure 8:
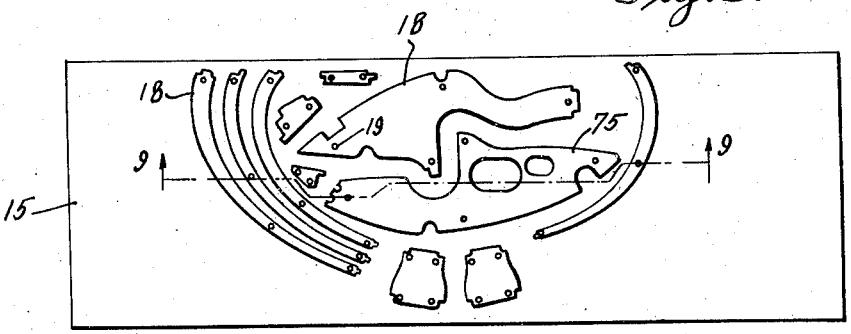
Figure 8 is a similar plan view illustrating the profiling templates in position over the stack of sheet metal parts as illustrated in Figures 5 to 7.
Figure 9:
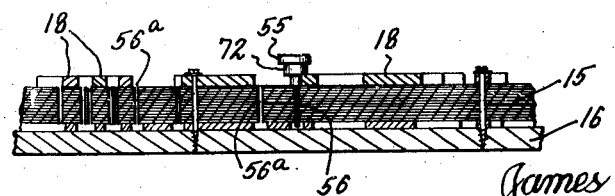
Figure 9 is a sectional edge elevation taken substantially on the line 9—9 of Figure 8 illustrating a portion of the profiled parts as having been preformed and the profiling mechanism in operation to perform the profiling of the multiple parts from the stack of relatively thin sheets of metal.

In accordance with my invention there are formed drilling templates 17 and profiling jigs 18 which are utilized as patterns in laying out the drilling operations and profiling operations upon the pattern tables 1 and 2. As illustrated in Figures 5 and 8, the drill templates 17 and the profiling jigs 18 are located and nested with relation to the top sheet of metal on the tables 1 and 2 in such a manner as to result in the minimum wastage of the sheet metal in forming the respective profiled sections or portions. Thus the sheets of metal stacked upon the pattern tables 1 and 2 may be, and constantly are, covered with the drilling templates 17 before the first operation, i. e., the forming of the necessary drill holes, is undertaken.

The nesting of the templates 17 upon the sheets of metal is undertaken so as to leave between the said templates only that amount of sheet metal as is required to be cut away as determined by the diameter of the profiling cutter and such slight addition as is desirable to insure proper profiling of the sheet metal parts. Thus the nesting of these templates 17 is related to the profiling operation and likewise determines the subsequent position of the profiling jigs 18 so that the operations of drilling and profiling the parts is performed without disturbing or removing the sheets of metal from the pattern tables 1 and 2 until the operation of forming is completed.

The first operation performed is to locate the sheets of metal to be drilled and profiled upon the pattern table. In this operation there may be used a master nesting template, which may be formed of thin galvanized sheet-iron containing the required tool holes only. The master nesting templates may be utilized as a matter of convenience for the quick location of the tool holes required. However, it is obvious that the tool hole location might also be had through the use of drilling templates 17.

The first operation performed is to drill the tool holes 19. The drilling of the tool holes is performed in exactly the same manner using the same drill means as are utilized in the drilling of all other holes as is hereinafter specifically described with relation to the hold-down means utilized in the formation of the drilled holes. The individual drilling templates 17 are fastened down by means of lag screws which are screwed down into the top of the drill table or through the cutting base 16. The individual templates utilized in the drilling operation have formed therein drill holes in location and size requisite for the locating of the drill and the sheet hold-down means in performing the individual drilling operations. The drilling templates 17 may be formed of sheet iron or any other suitable material.

This formation of the drill templates of any desired material is permitted as in accordance with my invention these templates are merely the hole-locating means. The templates do not act as drill guides to guide the drilling bits during drilling and are not subject to the wear occasioned by such drill guiding.

In the drilling operation, both of the tool holes and of the other holes, such as rivet holes, in the respective parts or portions, the drill means utilized may be of any suitable or desirable construction and is herein illustrated as a high-speed mechanism 20 which includes a vertically movable drilling spindle 21 carrying the customary drill chuck 22 supporting a high speed drill 23. The drill spindle has the customary depth regulating means 24 whereby the depth of movement of the drill 23 may be definitely predetermined.

Power means are provided for moving the spindle 21 vertically, which means are herein illustrated as including a cylinder 25 mounted above and with relation to the upper end of the drill stem 21. Mounted in the cylinder 25 is a piston 26. Between the piston 26 and the drill stem 21 is a rotatable bearing block 27 which may rotate with the drill stem 21 and with relation to the piston 26. The piston 26 is guided in a guide section 28 in the upper end of which air or other fluid under pressure is admitted through a conduit 29 to move the piston, bearing block 27, and drill stem 21 downwardly. As is customary in such drilling machines, the return motion of the piston 26 is through the medium of a spring mechanism operating through a pinion and rack and generally indicated at 30.

The particular form of drill press illustrated is of standard commercial manufacture to which the automatic feed-down mechanism described has been added, together with the drill locating and hold-down means as will hereinafter be described. The customary manual feed provided in such standard tool may also be utilized if desired.

The spindle is rotated through the use of a suitable power means such as an electric motor operating to drive a belt over a pulley 31 splined to the drill stem 21 as is common in this construction of machine. However, any other suitable form of drive mechanism for the drill press may be utilized, or any other desired form of construction or drill. The power to actuate the downward movement of the spindle 21 is controlled through an air valve generally indicated at 32 mounted in a control handle 33. The valve 32 may be of any suitable or desirable construction and has the function of controlling the admission of fluid or air under pressure to the cylinder 25.

In order to locate the drill 23 and to simultaneously exert a hold-down pressure upon the templates 17 and sheets of thin metal as stacked upon the pattern tables 1 or 2, I have provided the locating and hold-down means to enable the rapid and definite location of the drilled holes with respect to the templates utilized, and in order to hold the sheets of metal compressed together under sufficient pressure to avoid any tendency of the individual sheets to "climb" the drill 23 during drilling operation whereby I am enabled to form through the stacked sheets clean-cut holes without the possibility of forming burrs or fins around the hole as cut or drilled. In order to accomplish this object, I provide a presser foot 34 which is adapted to receive any one of a plurality of drill template guides 35. The guides 35 are threaded by threads 36 within the foot 34 so as to be removable in order to accommodate different size drills 23 as determined by the drilling aperture 37 formed through the base tapered section 35ª of the template guides 35.

The template guides 35 are formed with a central hole 37ª terminating in the drill aperture 37 through which the drills 23 extend. Means are provided for moving the presser foot 34 vertically to clamp the template 17 and sheets of thin metal 15 rigidly against the pattern tables or the cutting board as desired so as to avoid any tendency of the sheets of metal to travel up as the drill travels down, whereby formation of burrs or rough or eccentric drill holes is avoided.

This means as herein illustrated includes the yoke 38, the end of which forms the presser foot 34, which yoke 38 is normally urged to its upper position by means of a spring 39 connected between the yoke 38 and the frame support 40 of the drill press 20. The yoke 38 carries a plunger pin 41 and a guide pin 42. The guide pin 42 extends through a guide bushing 43 formed in horizontal guide extension 44 of the frame member 40. The pin 41 extends through a similar guide bushing 45 in the guide extension 44 and is guided in a cylinder liner 46 carried in the frame member 40, which cylinder liner 46 forms a pressure cylinder 47 into which fluid under pressure such as air is conducted through a conduit 48. The conduit 48 is interrupted by a control valve 49 mounted in the operating handle 50. The control valve 49 is urged by a spring 51 toward its closed position and may be actuated to its open position by means of an actuating plunger 52 extending from the upper end of the handle 50.

The frame 40 of the drill press 20 is supported to swivel on a vertical pivot 53 carried at the end of the drill press arm 11. The template guides 35 may, for example, be formed so that their tapered section 35ª is approximately a 45° taper, terminating in a lower diameter sufficiently less in diameter as compared with the guide holes formed in the template 17 as to permit the location of the template guides within these template holes. For example, the guide holes formed in the template 17 may be ⅜ inch holes, while the smallest diameter of the template guide at the lower end of the taper 38 is approximately 23/64 inch. Thus as the drill press 20 is moved along the surface of the template 17 with a slight downwardly pressure being exerted, the template guides 35 will find their way into template holes 17ª as illustrated in Figure 3, thereby centering the guide in the hole. After being thus centered, the valve 49 is actuated to exert a downward pressure through the presser foot 34 of, say, approximately 100 lbs. per square inch, thus firmly clamping the template sheets of thin metal and table, or cutting board, together before the drill 23 is lowered to drill the hole through the thin metal sheets.

After the presser foot is thus located, the motor switch 54 may be actuated to rotate the drill press spindle 21, if the drill is not already rotating, and then the operator may actuate the valve 32, or use the manual feed-down, to cause the spindle 21 to move downwardly, completing the drilling operation.

On release of the valve 32, which is spring returned and of a construction similar to the valve 49, the drill 23 is withdrawn, completing the drilling operation.

In moving the drill press over the surface of the template 17, or over the surface of the master template when forming the tool holes, the operator may conveniently control the operation and location of the drill 23 and the guide bushings 35 by the use of the two handles 33 and 50 which are gripped in the two hands and enable the quick and rapid manipulation of the drill so that many hundreds of holes may be actually drilled in accurate location in a very short space of time. It will thus be observed that in accordance with my invention, the drilling of the thin sheets of metal is performed in such manner that the drill is actually clamped to the sheets of thin metal at the point where the drill hole is to be formed, thus positively avoiding relative vibration between the work and the drilling bit during the drilling. It will also be observed that in accordance with my invention, the drill templates 17 clearly act as a guiding means for guiding the presser foot to the correct position. The templates 17 do not act as a means for guiding the drill during the drilling operation and are therefore not subject to wear, whereby these templates may be formed of relatively inexpensive material such as sheet iron or the like, and have a much longer period of life.

After the holes have been drilled through the use of the templates 17, the templates 17 are removed and the cut-out jigs 18 are then positioned over the stack of sheets of thin metal in substantially the same manner as the templates are located, being held in position by means of lag screws.

The profiling mechanism used for forming or profiling the parts with relation to the jigs 18 may be of any suitable or desirable construction and is herein illustrated as including a chuck 55 in which the profiler bit 56 is held. The chuck 55 is secured to the profiler shaft 57.

As herein illustrated, the profiler may be of the high speed turbine type, driven through the medium of compressed air and operating at a relatively high speed. The profiling mechanism is provided with two opposed handles 58 and 59 clamped to the housing for ease in manipulation by the operator. Air is supplied to the profiler motor through a conduit 60 through a suitable control valve 61. The profiler motor is carried in a slide 62 which permits of the vertical movement thereof and of the bit 56. Means are provided for accomplishing this vertical movement, which means are preferably of such construction as to permit of easy vertical adjustment while at the same time assuring the maintenance of the profiler in the adjusted position. In order to accomplish this vertical adjustment, an adjusting handle 63 is provided which is pinned to a shaft 64. The shaft 64 carries a cam 65, which cam 65 is mounted in a cam slot 66 carried in a slot plate 67 at the end of the profiler supporting arm 12. The cam shaft 64 is supported on the plate 68 upon which the profiler 14 is mounted. Thus by rotation of the handle 63, the cam 65 moves the profiler 14 vertically in its guideways. The plate 67 is adjustably mounted at the end of the arm 12 in guide slots 69 and is held in adjusted position by means of an adjusting screw 70, which is threaded as indicated at 71, in the plate 67, thus providing an initial adjustment for the magnitude of movement of the cutting bit 56 on the shifting of the position of the handle 63. By setting the position of the plate 67, a predetermined movement of the bit 56 may be had to determine the lower limit of movement.

A guide collar 72 is positioned between the b't 56 and the chuck 55, and this guide collar operating with relation to the jigs 18 determines the position of the cut as indicated at 53ª formed through the thin metal plates 15.

In utilizing the profiling means embodying my invention, it will be obvious that the profiling operation may be performed in a single operation by merely guiding the profiling means through the material with the collar 72 bearing against the edges of the jigs 18.

Under some operations it may be, and some times is, desirable to profile the parts in a two-step operation. When the two-step operation is utilized, a roughing collar 72 is first used, which is of slightly greater diameter than the finish guide collar 72. A roughing profiling is then performed in the same manner as when a single operation profiling is performed. After the roughing operation is completed, the roughing collar 72 is replaced with a finishing collar. The profiling operation is repeated and a very small finishing cut is made along the edges of the previously profiled parts. Under some operations using some materials, it is preferable that the finishing profile operation be performed by passing the profiling cutter around the jigs in a direction reverse of that utilized in the roughing profiling operation.

During the cutting out operations, a suitable cutting mixture or lubricant is employed, which may be of any suitable composition, as is well understood in the art such, for example, as one part of prime lard oil to three parts of pearl oil. This cutting lubricant may be supplied to the profiler in any suitable or desirable manner well understood in the art.

As illustrating the results obtained through the use of my method, a portion of a typical group of aircraft parts or sections are illustrated by the patterns of Figure 5. This consists of 35 various sizes of profiles which may be profiled from multiple sheets of thin metal. A single pattern set-up enables the production of 260 completely profiled and enclosed cut-outs having a total of 6470 drilled holes, and the complete drilling and profiling operation may be performed in the average time of 51 seconds per part.

By correct positioning of the patterns as illustrated in Figure 5, the waste of the original material used may be cut to a very low percentage of the sheets of metal used.

It will be obvious from the foregoing that both outside and inside profiling operations are made using the process and apparatus embodying my invention. For example, the template 73 of Figure 5 defines the inside cut-out 74 as well as the outside profile. The corresponding profiling jig 75 illustrated in Figure 8 likewise defines internal and external profiles. The difference in size of these openings, as well as the difference in external size, is accounted for by the set-back required due to the thickness of the guide collars 72 used in connection with the profiling operation.

Having fully described my invention as the same is incorporated or utilized in connection with the apparatus as illustrated, it is to be understood that I do not wish to be limited to the details herein set forth, but my invention is of the full scope of the appended claims.

I claim:

1. In a drilling apparatus, the combination of a substantially rigid table, and means for securing work sheets thereto, said means including a yieldable drilling pattern having drill hole locations therein, a pressure foot adapted to locate the positions for drilling by the drill hole locations formed in the pattern, means for applying pressure to the pressure foot at the drill hole locations as found, and means for drilling the hole through the pressure foot, the pressure-applying means being independent of the drilling means.

2. In an apparatus of the character described, the combination of a substantially rigid table, and means for securing work sheets thereto, said means including a pattern having drill hole locations therein, a pressure foot, means for swinging the pressure foot over the pattern to locate the drill holes therein, means for applying pressure to the pressure foot at the drill locations as found, the pressure foot having a drilling bit aperture therein for guiding a drilling bit, and means for advancing the drilling bit through the aperture to drill the hole at the location as found, said pressure-applying means being independent of said drill-advancing means.

3. In an apparatus of the character described, the combination of a drill and means for feeding it, a pressure foot having a guide aperture to receive the drill, and means other than said drill-feeding means for forcing the pressure foot into clamping position.

4. Drilling apparatus comprising a frame member and means supporting it for movement within a fixed plane, drilling means mounted on said frame for feeding movement perpendicular to said plane, a work-holding member also mounted on said frame for movement in the same direction as said feeding movement to engage the work, and independent means for feeding said drilling means and moving said member respectively.

5. Drilling apparatus as described in claim 4, including power means for feeding said drilling means, separate power means for moving said member into work-holding position, and separate control members for independently controlling said two power means.

6. Apparatus as described in claim 4, in which said frame member has two handles thereon adapted to be engaged by the two hands of an operator for moving said frame within said plane, separate power means for feeding said drill and moving said work-holding member respectively, and a control member for controlling power application to said work-holding member on one of said handles, and control means for controlling the application of power to said feeding means on the other of said handles.

7. The method of forming holes in metal sheets comprising stacking a plurality of said sheets together on a table, successively, locally compacting the stack of sheets against the table at different points, each closely adjacent a hole location, and simultaneously drilling all said sheets while they are so pressed together closely adjacent the hole being drilled.

JAMES HOWARD KINDELBERGER.